US008223666B2

(12) United States Patent
Jarvis et al.

(10) Patent No.: US 8,223,666 B2
(45) Date of Patent: *Jul. 17, 2012

(54) METHOD OF CONSTRUCTING A FORWARDING DATABASE FOR A DATA COMMUNICATIONS NETWORK

(75) Inventors: Neil Alasdair James Jarvis, Edinburgh (GB); Crispin Nicholas Dent-Young, Bristol (GB); Alan J. Cheilek, London (GB); Matthew James Collins, Paris (FR); Christian Cassar, Hamton (GB); Jesper Skriver, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 911 days.

This patent is subject to a terminal disclaimer.

(21) Appl. No.: 11/211,109

(22) Filed: Aug. 23, 2005

(65) Prior Publication Data

US 2007/0047463 A1   Mar. 1, 2007

(51) Int. Cl.
*H04L 12/28* (2006.01)
(52) U.S. Cl. ..................................... 370/254
(58) Field of Classification Search ............... 370/389, 370/400, 408, 254, 392, 401, 255
See application file for complete search history.

(56) References Cited

U.S. PATENT DOCUMENTS

| | | | | |
|---|---|---|---|---|
| 4,768,188 A | * | 8/1988 | Barnhart et al. | 370/434 |
| 5,630,173 A | | 5/1997 | Oprescu | |
| 6,067,574 A | * | 5/2000 | Tzeng | 709/247 |
| 6,141,738 A | * | 10/2000 | Munter et al. | 711/206 |
| 6,192,051 B1 | * | 2/2001 | Lipman et al. | 370/389 |
| 6,496,503 B1 | | 12/2002 | Pelissier et al. | |
| 6,606,630 B1 | | 8/2003 | Gunlock | |
| 6,938,095 B2 | * | 8/2005 | Basturk et al. | 709/238 |
| 7,089,335 B2 | | 8/2006 | Aiken et al. | |
| 7,318,108 B2 | * | 1/2008 | Sreekantiah et al. | 709/242 |
| 7,571,156 B1 | * | 8/2009 | Gupta et al. | 1/1 |
| 2004/0085953 A1 | * | 5/2004 | Davis | 370/356 |
| 2005/0131912 A1 | * | 6/2005 | Lin et al. | 707/100 |
| 2005/0232263 A1 | * | 10/2005 | Sagara | 370/389 |

OTHER PUBLICATIONS

Tony Przygienda et al., "M-ISIS: Multi-Topology (MT) Routing in IS-IS," IETF Network Working Group Internet Draft, Internet Engineering Task Force, pp. 1-13, Nov. 2005.
L. Andersson et al., "LDP Specification," IETF Request for Comments (RFC) 3036, Internet Engineering Task Force, pp. 1-124, Jan. 2001.
P. Psenak et al., "Multi-Topology (MT) Routing in OSPF," IEFT Network Working Group Internet Draft, Internet Engineering Task Force, pp. 1-23, Apr. 20, 2005.

(Continued)

*Primary Examiner* — Man Phan
*Assistant Examiner* — Nourali Mansoury
(74) *Attorney, Agent, or Firm* — Hickman Palermo Truong Becker Bingham Wong LLP

(57) ABSTRACT

A method of constructing a forwarding database for a data communications network comprising a plurality of network components and supporting at least first and second topologies having one or more common network components is described. The forwarding database includes a plurality of entries providing forwarding information for data destined for a related network component. The method comprises the step, performed at a constructing network component, of deriving topology dependent forwarding information for data destined for a network component. The method further comprises the step of including the topology dependent forwarding information at the related forwarding database entry.

21 Claims, 13 Drawing Sheets

| | Legend |
|---|---|
| 300 | Root mnode |
| 302 | mtrie 1 |
| 304 | mnode |
| 306 | mnode |
| 308 | mnode |
| 310 | Adjacency Table Entry |
| 312 | mnode |
| 314 | mnode |
| 316 | mnode |
| 318 | Adjacency Table Entry |
| 320 | Adjacency Table Entry |

OTHER PUBLICATIONS

E. Rosen et al., "Multiprotocol Label Switching Architecture," IETF RFC 3031, Internet Engineering Task Force, pp. 1-57, Jan. 2001.
Cisco Systems, Inc., "Cisco Express Forwarding Overview," Dec. 17, 2002, pp. 1-7, Cisco Systems, Inc., San Jose, California.
U.S. Appl. No. 11/211,105, filed Aug. 23, 2005, Office Action, Jul. 16, 2010.
U.S. Appl. No. 11/211,105, filed Aug. 23, 2005, Notice of Allowance Dec. 20, 2010.

* cited by examiner

| FIG. 1 Legend ||
|---|---|
| 100 | Network |
| 102 | Host |
| 104 | Host |
| 106 | Host |
| 108 | Host |
| 110 | Host |
| 112 | Host |
| 114 | Router |
| 116 | Internet |
| 118 | Router |
| 120 | Router |
| 122 | Autonomous System |
| 124 | Autonomous System |

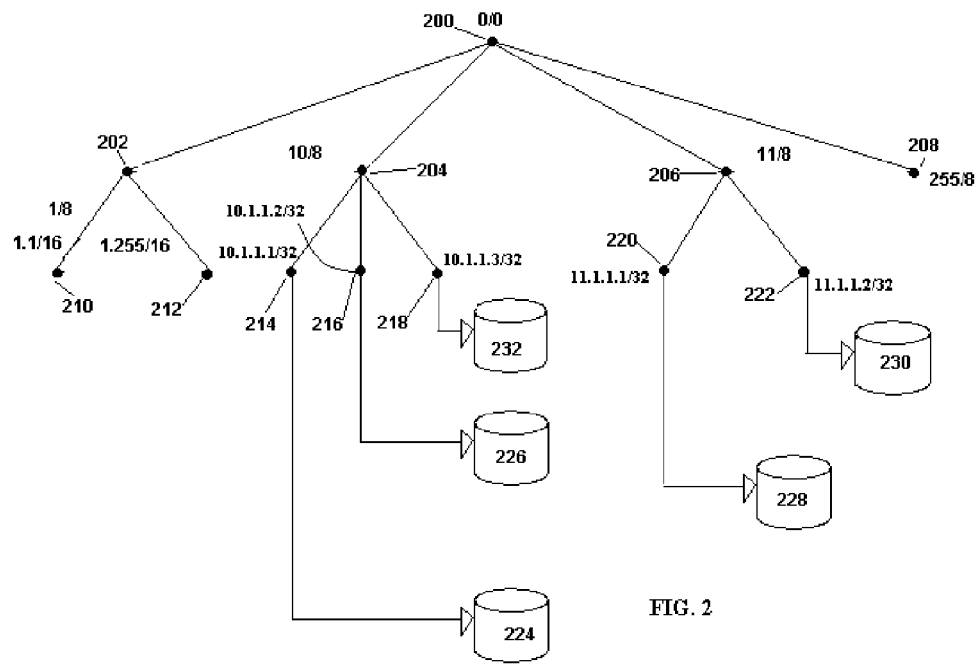

| FIG. 2 Legend | |
|---|---|
| 200 | Prefix Tree Entry 0/0 (prefix/mask) |
| 202 | Prefix Tree Entry 1/8 (prefix/mask) |
| 204 | Prefix Tree Entry 10/8 (prefix/mask) |
| 206 | Prefix Tree Entry 11/8 (prefix/mask) |
| 208 | Prefix Tree Entry 255/8 (prefix/mask) |
| 210 | Prefix Tree Entry 1.1/16 (prefix/mask) |
| 212 | Prefix Tree Entry 1.255/16 (prefix/mask) |
| 214 | Prefix 10.1.1.1/32 |
| 216 | Prefix 10.1.1.2/32 |
| 218 | Prefix 10.1.1.3/32 |
| 220 | Prefix 11.1.1.1/32 |
| 222 | Prefix 11.1.1.2/32 |
| 224 | Adjacency Table Element |
| 226 | Forwarding Information for 10.1.1.2/32 |
| 228 | Forwarding Information for 11.1.1.1/32 |
| 230 | Forwarding Information for 11.1.1.2/32 |
| 232 | Forwarding Information for 10.1.1.3/32 |

FIG. 2

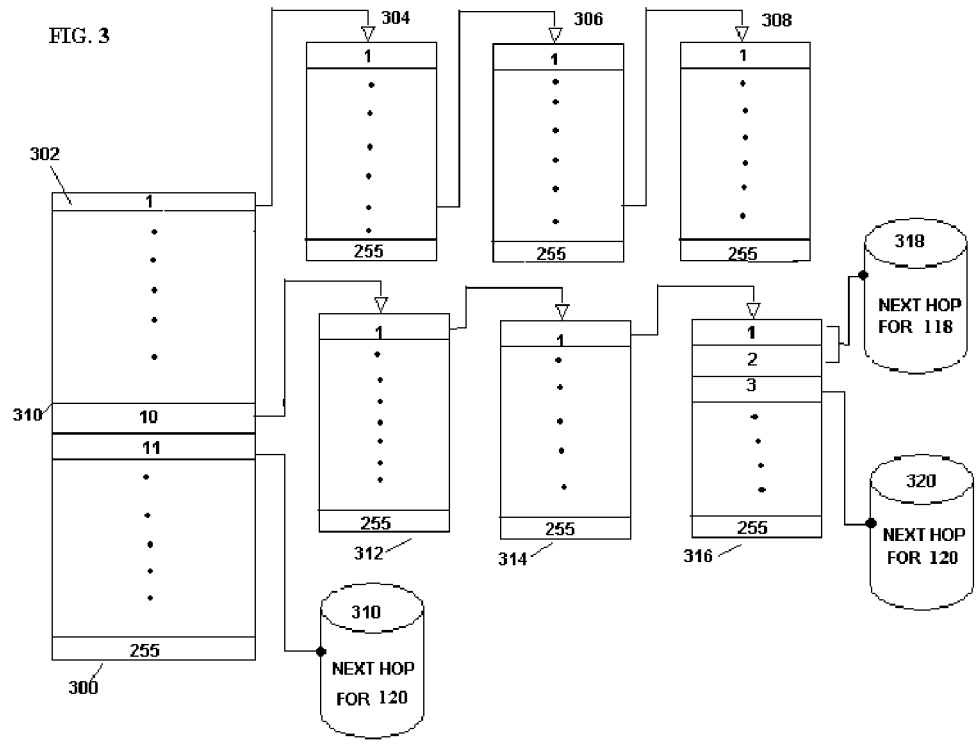
| FIG. 3 Legend | |
|---|---|
| 300 | Root mnode |
| 302 | mtrie 1 |
| 304 | mnode |
| 306 | mnode |
| 308 | mnode |
| 310 | Adjacency Table Entry |
| 312 | mnode |
| 314 | mnode |
| 316 | mnode |
| 318 | Adjacency Table Entry |
| 320 | Adjacency Table Entry |

| FIG. 4 Legend | |
|---|---|
| 400 | Output Chain |
| 402 | Output Chain |
| 404 | Output Chain Element |
| 406 | Output Chain Element |
| 408 | Output Chain Element |
| 410 | Output Chain Element |
| 412 | Output Chain Element |

| FIG. 5 Legend ||
|---|---|
| 102 | Host |
| 104 | Host |
| 106 | Host |
| 108 | Host |
| 110 | Host |
| 112 | Host |
| 114 | Router |
| 116 | Internet |
| 118 | Router |
| 120 | Router |
| 122 | Autonomous System |
| 124 | Autonomous System |

METHOD OF CONSTRUCTING A FORWARDING DATABASE FOR A DATA COMMUNICATIONS NETWORK

CROSS-REFERENCE TO RELATED APPLICATIONS

This application is related to U.S. Pat. No. 7,969,995, entitled "Method and Apparatus for Constructing a Forwarding Database for a Data Communications Network," filed on Aug. 23, 2005.

FIELD OF THE INVENTION

The present invention generally relates to forwarding databases. The invention relates more specifically to a method of constructing a forwarding database for a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent in a network comprising network components from a source to a destination component via a network of components including links (communication paths such as telephone or optical lines) and routers directing the packet along one or more of a plurality of links connected to it according to one of various routing protocols.

For example referring to FIG. 1 which represents an illustrative network designated generally 100, a source network component such as a host 102 sends a data packet to a destination network component for example one of hosts 104, 106, 108, 110 or 112. The packet is routed by a router 114 via a network such as the Internet 116 and a further router 118 or 120 as appropriate serving the destination component. The source and destination hosts can be any appropriate components for example voice components such as a voice over IP (VoIP) phone, a PC and so forth.

One routing protocol commonly used for routing data within data communication networks is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

The LSPs are sent, for example, by routers such as components 114, 118, 120 and advertise the network components served by the router. For example router 118 may advertise that it serves components 104, 106, 108 and so forth.

Various alternative routing systems include distance vector routing and multi-protocol label swapping (MPLS) whereby the path taken by a packet is partially or fully predetermined. However in all cases, when a data packet for a destination arrives at a forwarding component such as a router, the forwarding component must identify the next component ("next hop") along the route for forwarding the packet to the destination. The next hop is obtained from the FIB as described above. The next node repeats this step and so forth.

The destination for a packet is expressed as an internet protocol (EP) address and hence part of the forwarding operation is to obtain the forwarding information such as next hop details for route to the destination address.

The manner in which the forwarding information is obtained has developed as a result of the structure of IP addresses. Under the current addressing scheme set up under Internet protocol version 4 (IPv4), IP addresses have 32 bits divided into four octets and commonly represented as xxx.xxx.xxx.xxx where xxx comprises the decimal value corresponding to the binary value of the octet and ranging from zero to 255 for each octet.

Various address assignment schemes have been adopted and commonly a group of addresses is assigned to a group of components sharing a common routing policy (for example an autonomous system (AS)) such that all components within the AS share a common "prefix", that is, the first n most significant bits of the IP address, but are distinguished by the remaining (32-n) bits which are distinct for each component. Accordingly, where a router serves as the ingress point to an AS, then external components can simply forward packets for any component in the AS to the router serving it, which will then forward the packets appropriately within the AS for the destination component. In those circumstances the serving router advertises its availability, is commonly termed a prefix and is represented by a prefix/mask of the form xxx.xxx.xxx.xxx/n where n is the mask length representing the number of bits in the prefix. For example, an address 10.0.0.0/8, or 10/8 for short, means that the prefix is formed of the first 8 bits having the value 00001010. As a result components served by the prefix can have addresses in the range 10.1.1.1 to 10.255.255.255.

Reverting for example to FIG. 1, router 118 has address 10.0.0.0 and serves an AS 122 above component 104 in network 122 has address 10.1.1.1, component 106 has address 10.1.1.2 and component 108 has address 10.1.1.3. Similarly router 120 has address 11.0.0.0 and serves an AS 124, and it serves component 110 having an address 11.1.1.1 and component 112 having an address 11.1.1.2.

When a packet arrives at a router for example in the network 116, for destination xxx.xxx.xxx.xxx, the node needs to identify which prefix to send the packet to (i.e. the prefix serving that address) and then obtain the forwarding information including identifying the next hop in the route to that prefix, however that next hop may be determined.

However in practice it is not necessarily sufficient simply to identify the prefix within the destination address and send it to the corresponding router. Firstly this is because it is necessary also to identify the appropriate prefix mask, that is, which part of the address in fact comprises the prefix. Secondly, as a result of the manner in which some networks are constructed, components with an AS nominally attached to a first router may nonetheless be served by another router. For example referring to FIG. 1, component 108 having address 10.1.1.3 in network 122 generally attached to router 118 is in fact advertised by router 120 such that it would not be appropriate to simply direct packets destined for 10.1.1.3 to the next hop of the route to 10/8.

Accordingly various forwarding database structures and steps are conventionally implemented to ensure that the correct forwarding information is derived for each destination address. In particular longest prefix matching is implemented as can be understood with reference to FIG. 2 which is a schematic diagram of a prefix tree constructed at some router in the network 116 in FIG. 1. The prefix tree illustrates at a conceptual level the manner in which longest prefix matching is put into practice comprises a forwarding database containing prefix records indexed by network addresses and masks and containing forwarding information allowing data to be forwarded to its destination. As can be seen, the prefix tree is rooted at a default entry 0/0, reference numeral 200. The tree then branches to (or "covers") a subset of nodes or entries representing a prefix that is present in the network and having a branch for each prefix that prefix/mask 1/8, 10/8, 11/8 and 255/8 denoted here by reference numerals 202, 204, 206, 208. Each entry then branches into prefixes that it covers. For example 1/8 (not shown in the diagram) might cover any of 1.1/16 through to 1.255/16, reference numerals 210, 212. Each downstream entry therefore has a direct cover—the prefix from which it branches, and further covering nodes upstream of the direct cover as appropriate.

Reverting to the topology shown in FIG. 1 it will be seen that the entries for 10/8 and 11/8 cover prefixes 10.1.1.1/32, 10.1.1.2/32, 10.1.1.3/32 and 11.1.1.1/32 and 11.1.1.2/32 respectively, reference numerals 214, 216, 218, 220, 222 (intervening branches are not shown for the purposes of clarity). For each of these prefixes or "leaves" appropriate forwarding information is shown for example in the form of a pointer to an adjacency table entry.

For example 10.1.1.1/32 points to an adjacency table element 224 which indicates the next hop for example by providing an MAC (media access control) address and router interface. In particular the forwarding information includes the next hop along the route to route 118. Similarly the forwarding information for 10.1.1.2/32, 226, also includes the next hop for route 118, and the forwarding information for 11.1.1.1/32 and 11.1.1.2/32 stored at database element 228, 230 is the next hop for route 120.

However in the case of 10.1.1.3/32, the forwarding information stored at database element 232 comprises the next hop along the route to route 120 which has advertised its adjacency to 10.1.1.3 as shown in FIG. 1 and discussed above. It can be seen, therefore, that by longest prefix matching of the destination address, the appropriate forwarding information can be derived.

One known way of performing longest prefix matching is to implement an mtrie, for example of the type described in "Cisco Express Forwarding Overview" which is available at the time of writing on the file cef-ov-final.pdf in the directory warp/public/732/Tech/switching/docs of the domain cisco [dot]com on the World Wide Web. The mtrie includes a plurality of mtrie nodes (or "mnodes") including a root node and a plurality of child nodes. Each node has a plurality of elements sometimes termed "buckets" containing a pointer to a record such as a forwarding instruction for a prefix represented by that element or to a child node comprising a further set of elements. Where an mtrie comprises a pointer to a record it is termed a leaf. As a result a set of (prefix, record) pairs is provided supporting a lookup of an address such that, if the address has a match in the topology, the record for the longest matching prefix in the topology is returned.

Referring to FIG. 3 which is a diagram of an mtrie structure, the FIB can be structured as a 256-way mtrie structure comprising an "mnode" 300 having up to 256 children representing the 256 possible octets depending from the node. For example mtrie 1, reference numeral 302, in m node 300 points to a child mnode 304 made up of 256 entries each of which points to a further 256 way child mnode 306 each of which points to yet another 256 entry child mnode 308. Each mnode entry either points to another mnode or to a leaf corresponding to a forwarding information base entry such as an adjacency table element providing the relevant forwarding information. It will be seen that as a result IP addresses comprising four octets can be subjected to a longest prefix match by walking down each mnode in turn and following the pointer from the corresponding mtrie. The four octet representation is termed an "8-8-8-8 stride pattern". For example reverting to the topology shown in FIG. 1, in order to perform a longest prefix match on either of 11.1.1.1 or 11.1.1.2, the corresponding entry in mnode 300 simply points to an adjacency table entry 310 including the relevant forwarding information, namely the next hop on the route to route 120. The entries for 10.1.1.1, 10.1.1.2 and 10.1.1.3 require a walk through the tenth child, reference numeral 310 of the root mnode 300, the first child off succeeding mnode 312, the first child of succeeding mnode 314 and, respectively, the first and second child off mnode 316 which in turn point commonly to an adjacency table element entry 318 containing, as forwarding information, the next hop for the route to route 118. However for destination 10.1.1.3 the third child of mnode 316 points to adjacency table entry 320 representing as forwarding information the next hop for route 120.

Typically each adjacency table entry comprises a record containing various forwarding instructions in addition to identification of the next hop, and common records can be considered as a forwarding equivalence class (FEC). The FEC can be represented as an output chain comprising successive output chain elements (oce) each representing different functions for example derivable from a common function table.

This is shown in FIG. 4 which is a schematic diagram illustrating a possible output chain configuration. The pointer from the final mnode in fact points to the start of the appropriate output chain. In particular two output chains designated 400 and 402 are shown. Output chain 400 comprises as a first oce 404, a choice oce for example dependent on whether the packet is IPv4 or IPv6 (EP version 6). Then, in the IPv4 limb a further oce 406 may be, for example, a load balancing instruction followed by a forwarding oce 408 selected by the load balancing oce for the appropriate next hop. On the IPv6 limb, however, the subsequent oce 410 may be, for example, a forwarding oce to the next hop. Any complexity of output chain is permissible and an alternative possibility is shown at 402 comprising simply a forwarding oce 412 to the next hop.

It can be seen that the oce's can be grouped in FIG. 4 as FECs FEC1, FEC2 allowing a simplified structure whereby any node sharing a common forwarding instruction structure can effectively identify it by listing the appropriate FEC. For example the entries against 11.1.1.1 and 11.1.11.2 may be identical such that the same FEC may be called for either.

A current proposition in network design is the provision of multi topology routing (MTR). Multi-topology routing is described in "M-ISIS: Multi-topology routing in IS-IS" by T. Przygienda et al., which is available at the time of writing on the file "isis-wg-multi-topology-00.txt" in the directory proceedings/Olmar/I-D" of the domain "IETF[dot]org" of the world wide web. In multi-topology routing one or more additional topologies is overlaid on a base or default topology and different classes of data are assigned to different topologies and classified accordingly during the forwarding operation. For example the base topology will be the entire network and an additional topology will be a subset of the base topology. It will be appreciated that the physical components of the network are common to both topologies but that for various reasons it may be desirable to assign certain classes of traffic to only a certain subset of the entire network as a result of which the multi-topology concept provides a useful approach to providing this functionality.

One example of the use of multiple topologies is where one class of data requires low latency links, for example VoIP data. As a result such data may be sent preferably via physical landlines rather than, for example, high latency links such as satellite links. As a result an additional topology is defined as all low latency links on the network and VoIP data packets are assigned to the additional topology. Another example is security-critical traffic which may be assigned to an additional topology of non-radiative links. Further possible examples are file transfer protocol (FTP) or SMTP (simple mail transfer protocol) traffic which can be assigned to an additional topology comprising high latency links, Internet Protocol version 4 (IPv4) versus Internet Protocol version 6 (IPv6) traffic which may be assigned to different topologies or data to be distinguished by the quality of service (QoS) assigned to it.

Multi-topology routing can be performed in a strict or a preferred (or incremental) mode. In the strict mode a data packet must travel only over the assigned additional topology and otherwise be discarded, for example in the case of security critical traffic. In the incremental mode data packets are preferably sent over the assigned topology but may also pass through the default topology where there is no path using only the assigned topology; thus, the assigned topology is considered preferred, but not strictly required.

Each MTR topology is often referred to by its color for differentiation and an MTR route will always have a base or uncolored topology in addition to zero, one or more configured colored topologies. Inbound packets to an MTR router will have a topology color assigned by a classification engine. As a result in strict mode the forwarding decision is made in the forwarding database of the packet color's topology and dropped if no route is available in the colored topology whereas in incremental mode the forwarding node decision may "fall back" to the base topology, if the forwarding decision cannot be made in the forwarding database of the packet color topology.

FIG. 5 depicts an illustrative network diagram of a multi-topology routing domain based on the topology shown in FIG. 1. Those elements shown in dotted lines form part of the base topology. Elements shown in solid lines also form part of a colored topology, termed here purely for the purposes of convenience and without limitation, a "red" topology. Data to be carried by the relevant topologies is identified by the same color and it will be appreciated that any appropriate nomenclature can be adopted.

It can be seen that router 120 and components 10.1.1.1 and 11.1.1.1 are in the red topology and base topology whereas router 118 and components 10.1.1.2, 10.1.1.3 and 11.1.11.2 are in the base topology only. For example components 10.1.1.1 and 11.1.1.1 may be VoIP phones requiring a higher priority for data traffic in view of its real time requirements. It will further be seen that the component 10.1.1.1 is reachable in the red topology from the route 120.

A complex forwarding database structure is required to support multi topology routing. In particular multiple prefix trees are required one for each topology. Each topology contains a set of prefixes and each prefix will have record comprising a respective FEC. Depending on the network topology and routing configuration prefixes may be present on one or more topologies and the list of FECs may not be the same for each topology. With this structure, MTR strict forwarding is a simple single longest match lookup in the packet color's topology prefix trie. However MTR incremental forwarding may require a second longest match look up in the base topology prefix tree. As a result there is a significant memory and hardware forwarding overhead.

Referring for example to FIGS. 6a and 6b which are schematic representations of prefix trees for the base and red topologies respectively for the network of FIG. 5, the additional storage and look-up requirements can be understood in more detail. The relevant components of the prefix tree in FIG. 2 are shown and numbered similarly in FIGS. 6a and 6b. In the base topology the forwarding information for the various addresses is the same as that shown in FIG. 2, for example 10.1.1.1/32 and 10.1.1.2/32 share as an FEC a forwarding instruction "next hop for router 118" whereas 11.1.1.1/32 and 11.1.1.2/32 share as FEC a forwarding instruction "next hop for router 120". However in the red topology 10.1.1.1 and 11.1.1.1 have a forwarding instruction "next hop for router 120" and hence may share the same FEC. However 10.1.1.2 and 11.1.1.2 are not configured in the red topology. As a result when a red packet is classified and the red prefix tree shown in FIG. 6b invoked, then no forwarding instruction will be available for packets destined for 10.1.1.2 and 11.1.1.2. As result, in strict forwarding the packet will be flushed. However in incremental mode it will be necessary to perform a second longest prefix match lookup in the base topology prefix tree to allow the packet to proceed to its destination in the base topology. Performing two, successive lookups in this way requires more resources than performing one and thus can make routers supporting MTRs slower or more expensive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a representation of a prefix tree for the network of FIG. 1;

FIG. 3 is a representation of an mtrie corresponding to the prefix tree of FIG. 2;

DETAILED DESCRIPTION OF THE PREFERRED EMBODIMENT

A method and apparatus for constructing a forwarding database is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Constructing a Forwarding Database
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for constructing a forwarding database for a data communications network comprising a plurality of network components and supporting at least first and second topologies having one or more common network components. The forwarding database includes a plurality of entries providing forwarding information for data destined for a related network component. The method comprises, the step, performed at a constructing network component, of deriving topology dependent forwarding information for data destined for a network component. The method further comprises the step of including the topology dependent forwarding information at the related forwarding database entry.

In other aspects, the invention encompasses a computer apparatus and a computer-readable medium configured to carry out the foregoing steps.

2.0 Structural and Functional Overview

Figure 7:
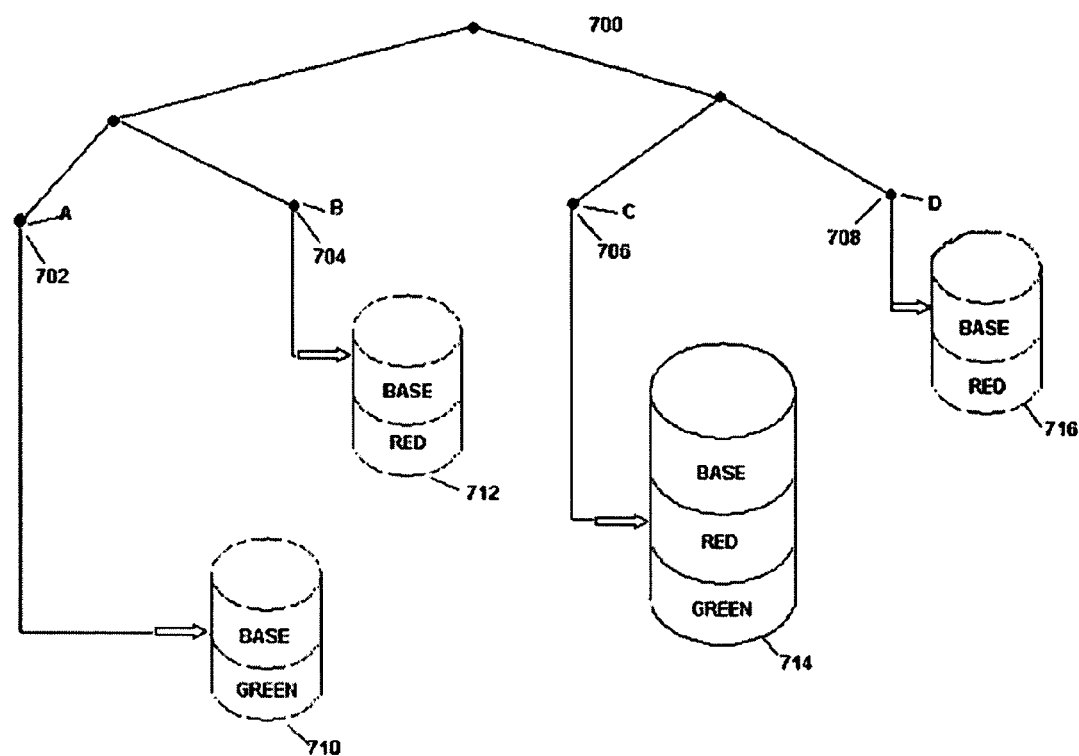
FIG. 7 is a diagram illustrating a single prefix tree for multiple topologies.

In overview a method for constructing a forwarding database at a constructing network component such as a routing constructing its FIB can be understood with reference to FIG. 7 which is a diagram showing a single prefix tree storing multiple sets of prefixes as entries, one set for each MTR topology including the base topology in a single database thereby significantly reducing memory requirements where there is overlap of prefix sets. For example where the prefix tree designated generally 700 includes entries related to network components A, B, C, D, reference numerals 702, 704, 706, 708 respectively, then it will be seen that the forwarding information is stored at database entries 710, 712, 714, 716 respectively dependent on the required topology. For example where the MTR topologies include base, green and red, and address A is in both a base and a green topology forwarding instructions for both are stored at entry 710 whereas forwarding instructions for address B are provided in base and red topology, for address C in base, red and green topology and address D in base and red topology.

As a result, for a forwarding database such as a prefix tree having common network components in different topologies, each forwarding database entry can include topology dependent forwarding information such that for a packet destined for given destination address it is necessary only to perform a single longest prefix match lookup on the prefix tree 700 and then follow the forwarding instruction relevant to the respective topology. Appropriate steps can be taken whether the forwarding mode is strict or incremental.

As described in more detail below, various optimizations are available for constructing an original or updated forwarding database. For example each prefix in the tree may inherit forwarding information from a covering prefix dependent on the MTR forwarding mode. In order to support incremental mode, a prefix may in addition copy the base topology forwarding information from the covering prefix. In the event of a change to forwarding instructions at a prefix, downstream covered entries on the forwarding database can maintain a dependency list to establish whether they have inherited forwarding information from the covering prefix ensuring that only dependent prefixes must re-inherit information from the changed covering prefix. Yet further, in cases where the lists of FECs are identical, indexing by color can be avoided at forwarding times.

As result the single prefix tree is more memory efficient where prefixes appear in more than one of the topologies and also allows automatic tracking of covering and covered relationships between prefixes and different sets hence supporting incremental and MTR using a single lookup followed by a class based demultiplexing operation.

3.0 Method of Constructing a Forwarding Database

Figure 1:
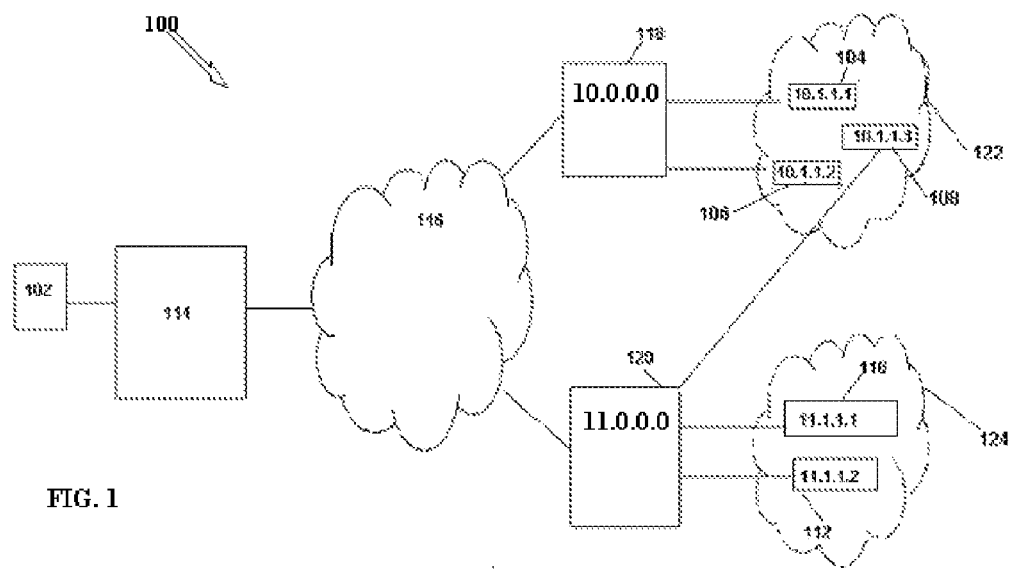
FIG. 1 is a representation of a network illustrating a method of constructing a forwarding database.
Figure 4:
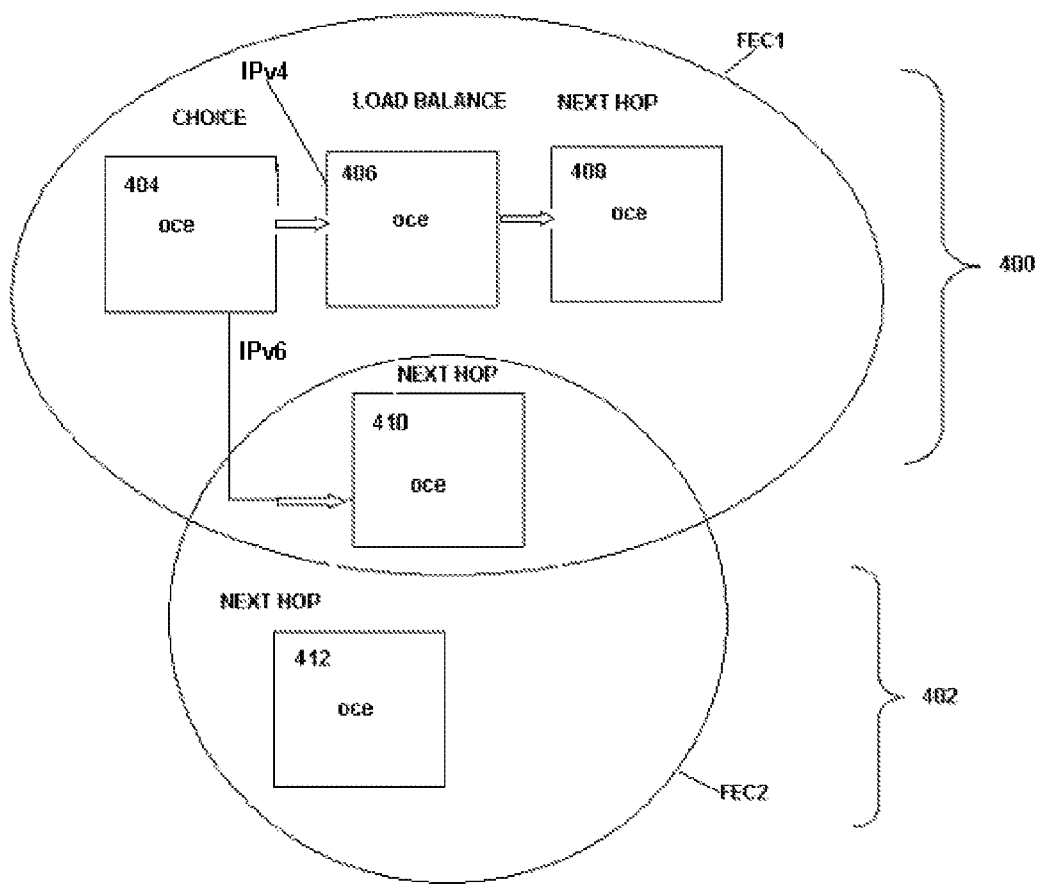
FIG. 4 is a block diagram illustrating output chains comprising forwarding instructions.
Figure 5:
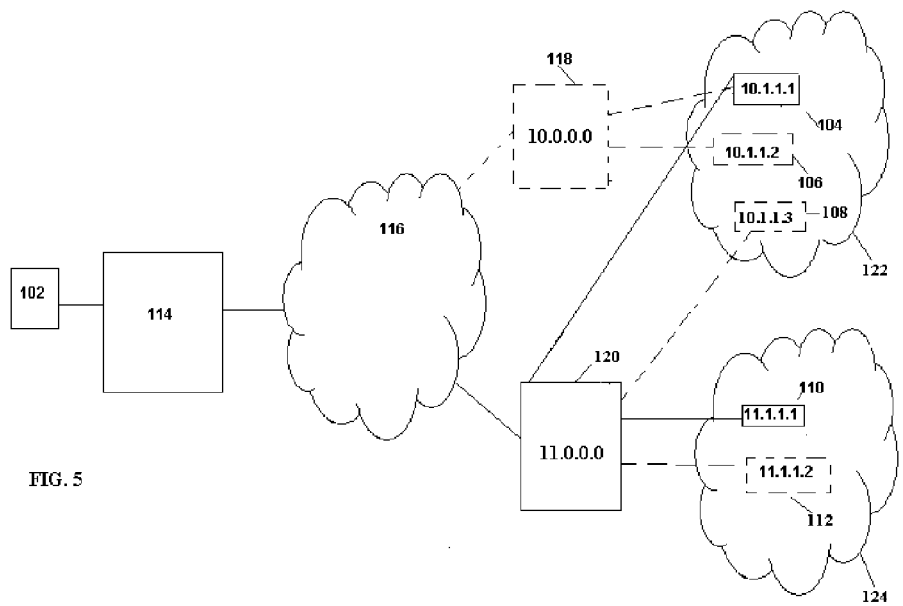
FIG. 5 is a representation of a multi-topology network.
Figure 6A:
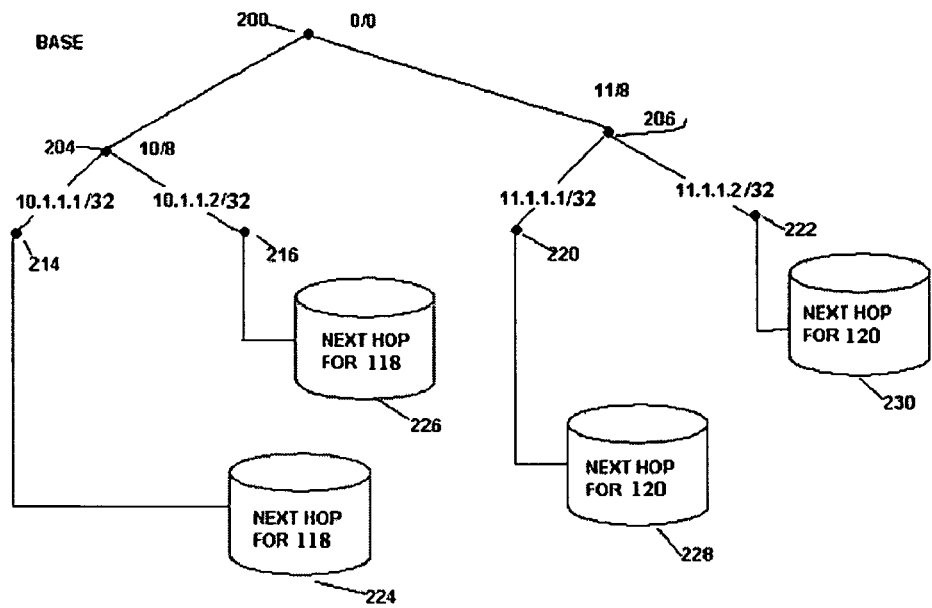
FIG. 6a is a diagram illustrating a prefix tree for a base topology.
Figure 6B:
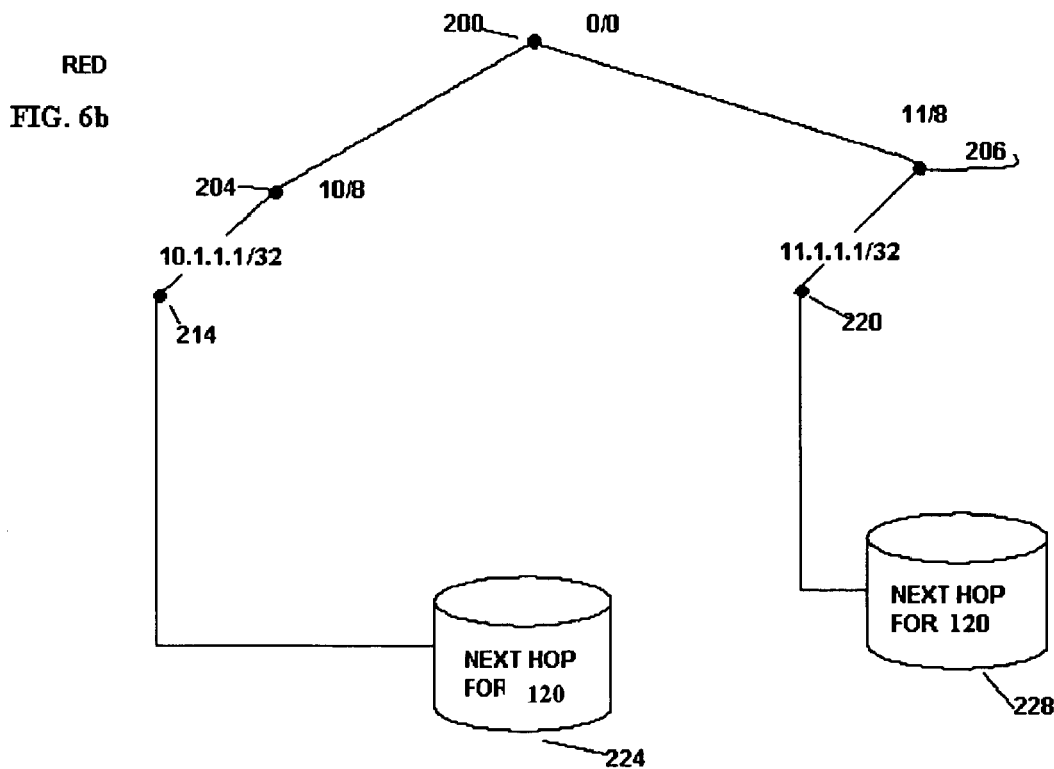
FIG. 6b is a diagram illustrating a prefix tree for a red topology.

For purposes of illustrating a clear example the method described herein in some instances refers to its applicability in relation to a multi-topology network of the type shown in FIG. 5. However the method described herein is not limited to the context of FIG. 5 and may be applied to any appropriate multi-topology routing domain.

Figure 8:
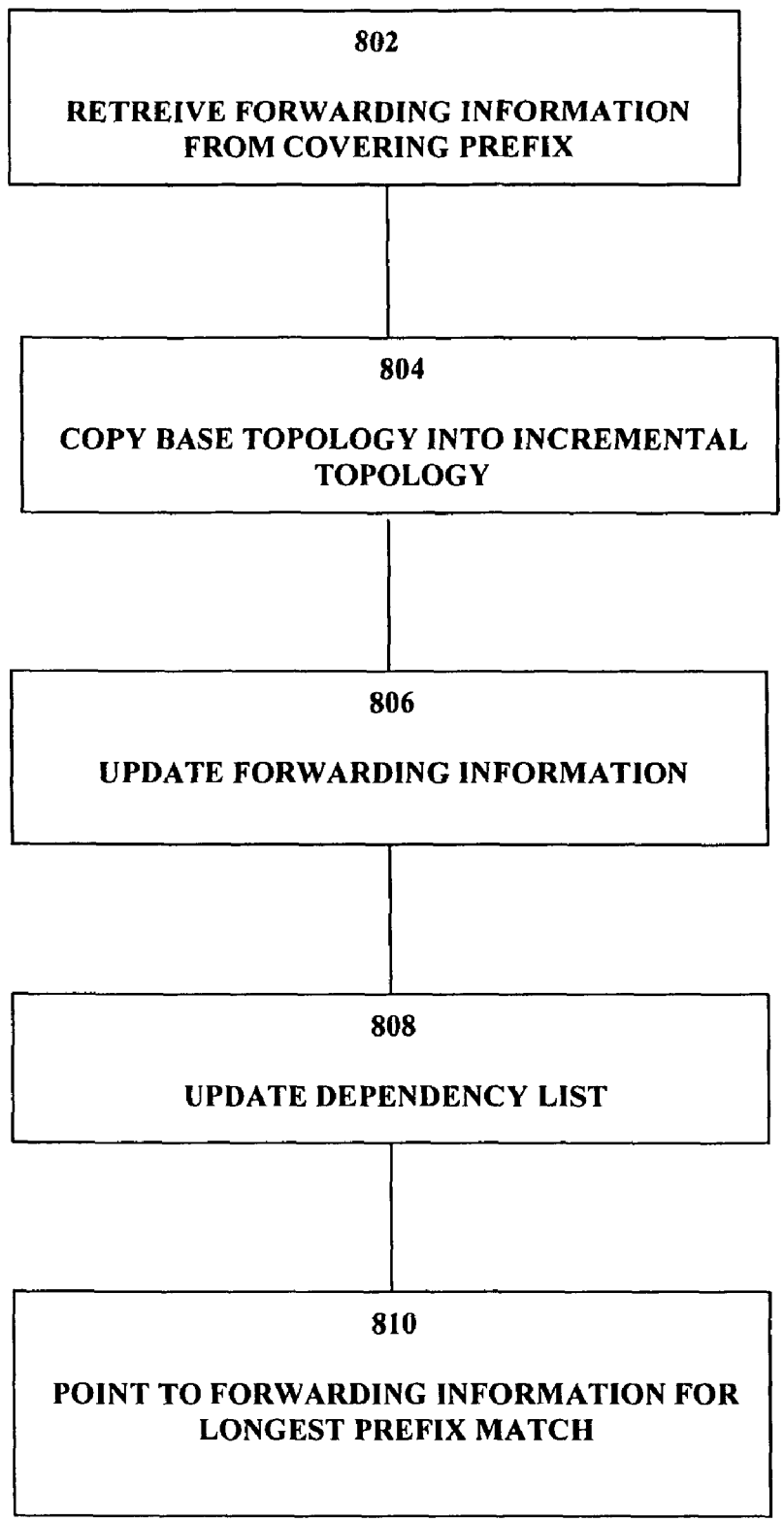
FIG. 8 is a flow diagram illustrating a method of constructing a forwarding database.

The method can be further understood with reference to FIG. 8 which shows a flow diagram illustrating in more detail the method applied. In particular, in order that all relevant forwarding information for all topologies is available at each prefix, an "inheritance" scheme is implemented such that a prefix on the single prefix tree effectively maintains additional forwarding information from its covering prefix in the event that it does not have appropriate forwarding information itself.

Accordingly, in block 802 the prefix retrieves forwarding information from its covering prefix. By inheriting the information the requirement to walk back up the prefix tree is avoided; as the step is carried out at each node on the tree, it will be seen that the information in the tree effectively cascades down the tree. Conversely it can be seen that if the information is not available at an entry on the tree then it is possible to "regain" the correct topology information further up the tree.

In block 804, the prefix further copies the base topology into any additional topologies supporting incremental mode and for which no colored (additional) topology information has been inherited from the covering node. As a result if a packet arrives and is classified into that additional topology then it can be forwarded in the base topology, as allowed in incremental mode, even though no additional topology information was inherited. Accordingly it can be seen that incremental mode forwarding information can be built onto the inherited base topology forwarding information where appropriate.

In block 806 the system then updates its forwarding information as appropriate to reflect the various topologies now supported. It will be seen that the steps can be performed during construction of an initial or updated FIB prefix tree such that all forwarding information is available instantly rather than requiring computation in runtime.

In block 808 the prefix further updates a dependency list to indicate all direct or other covering prefixes from which it has inherited forwarding information which allows the optimization of updating the structure following changes to covering nodes as described in more detail below. In block 810, during a longest prefix match for a destination address, appropriate forwarding information is then provided for the required topology. For example in the case of strict mode, if no forwarding information is available for that topology the packet will be dropped whereas in incremental mode then either the additional topology or, if not, the copied base topology forwarding information will be used.

Figure 9:
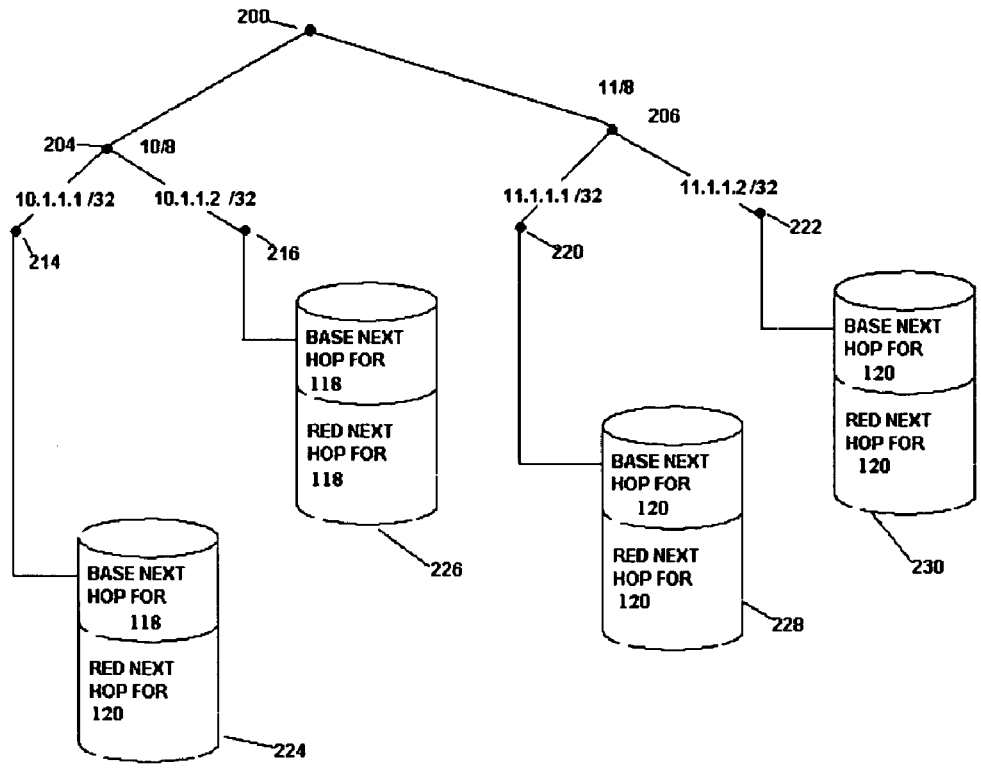
FIG. 9 is a diagram illustrating a prefix tree invoking inheritance rules.

Referring now to FIG. 9, which is a diagram illustrating a prefix tree in which forwarding information is inherited, a single prefix tree derived for the topology shown in FIG. 5 can be understood in more detail, where reference numerals common with those of FIG. 2 are adopted as appropriate. It will be seen that the forwarding instruction for 10.1.1.1 is next hop for router 118 in base topology and next hop for router 120 in red topology. However the forwarding instruction for 10.1.1.2 is next hop for router 118 for the base topology and this is also copied into the red topology in incremental mode because 10.1.1.2 is not in the red topology. In the case of 11.1.1.1 the next hop in both the base and red topologies is the next hop for router 120 in that topology but it will be noted that 11.1.1.2 uses the forwarding instruction for base topology for 11.1.1.2 in incremental mode. It will be noted, of course, that the next hop for a given prefix may differ between topologies, even where, as is expected, common calculations are adopted for calculating the next hop, in view of the differences between the topologies. As a result the forwarding instructions for 11.1.1.1 in the respective topologies represented by the database entry 228 may in fact differ if the next hop for router 120 is different in the base topology than in the red topology.

Figure 10:
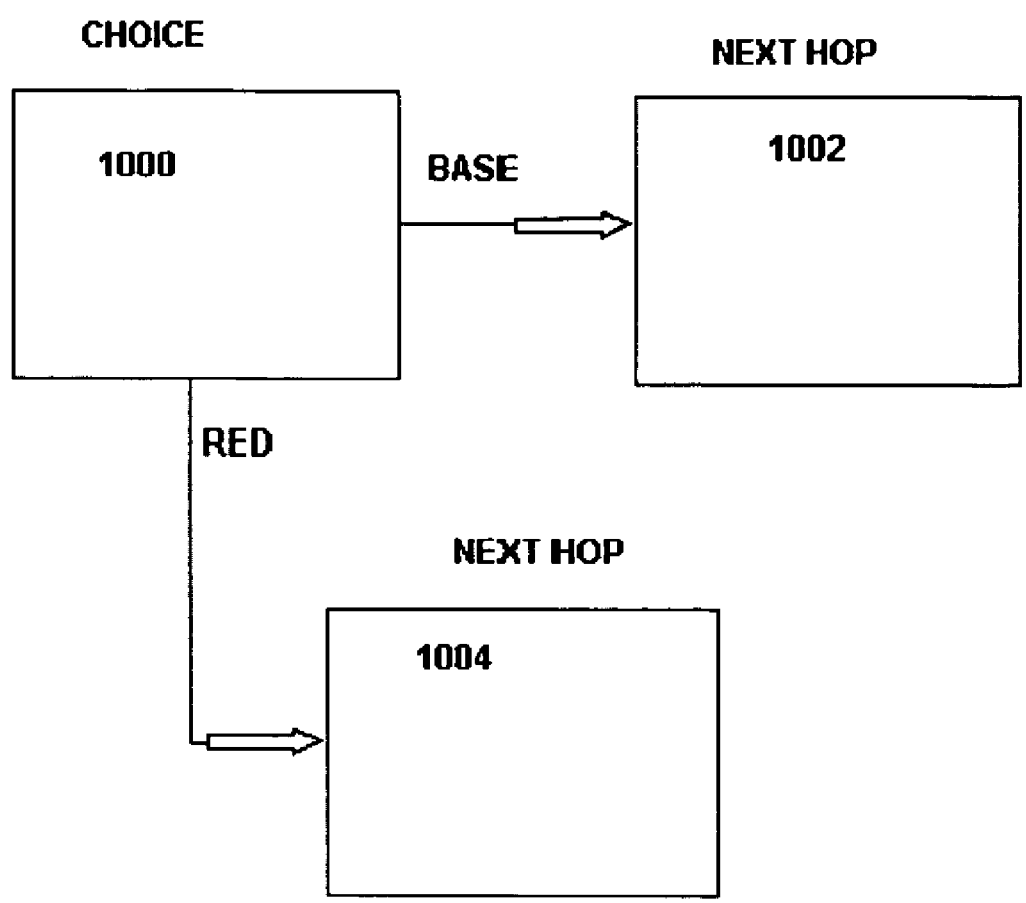
FIG. 10 is a block diagram illustrating an output chain for a single prefix tree.

Referring to FIG. 10, which comprises a block diagram illustrating an output chain, the class-based demultiplexing operation performed at the forwarding instruction pointer for a given prefix can be understood in more detail. In particular, a topology selection element comprising a first, choice oce 1000 selects between base and red topology based on a classification of the packet, i.e. identification of its color. It will be appreciated, of course, that the choice oce can provide selection between multiple topologies. Then a first next hop oce 1002 is provided for the base topology and a second next hop oce 1004 for the red topology. Where the FECs are identical, for example where the red next hop oce is identical to that of the base topology then in fact the choice oce 1000 is not required as a result of which the processing chain is shortened and indexing by color can be avoided at forwarding time, further reducing memory consumption and improving forwarding time performance.

Figure 11:
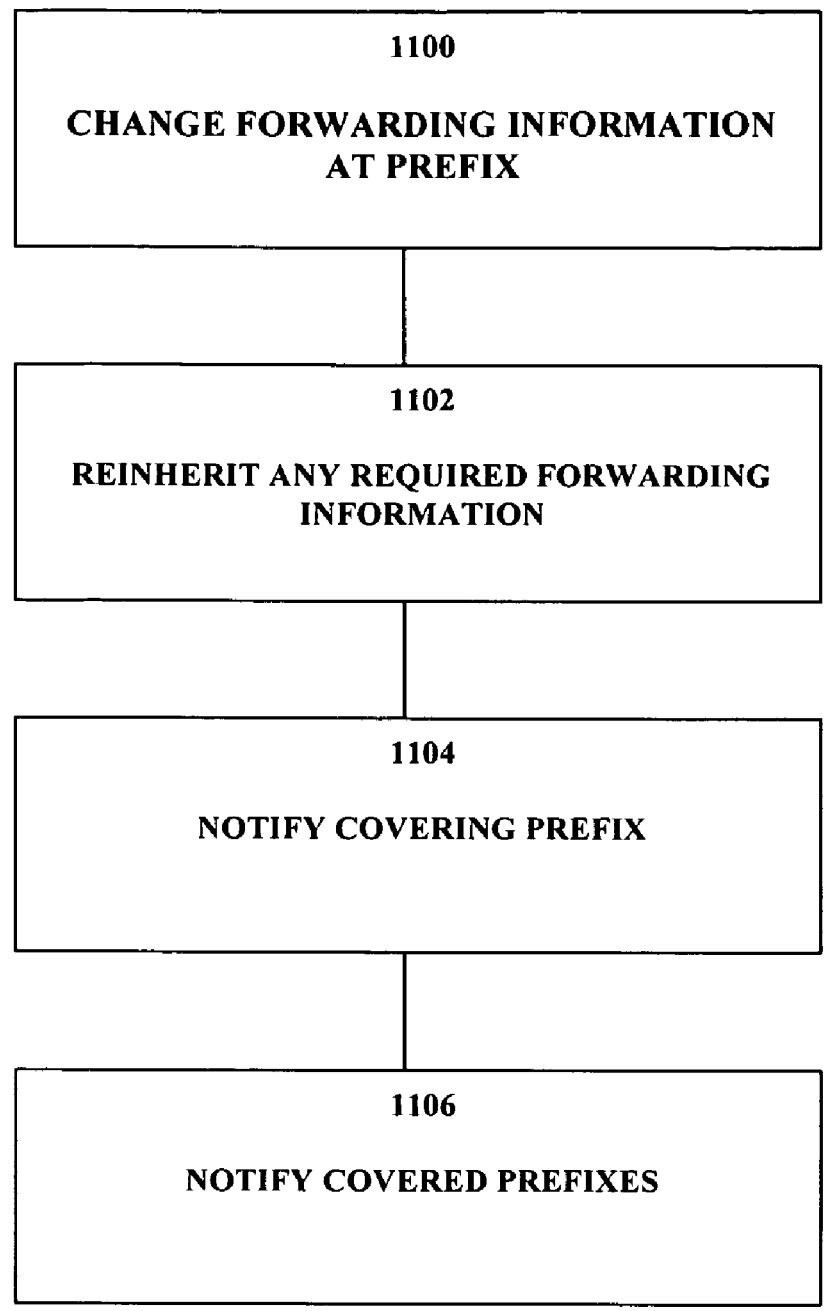
FIG. 11 is a flow diagram illustrating a method of constructing an updated forwarding database.

Referring to FIG. 11, which is a flow diagram illustrating the steps performed at an invoking prefix entry on a prefix tree for constructing an updated prefix tree, it will be seen that in the event that forwarding information for a prefix changes, the change can be propagated through the tree. In block 1100 the forwarding information is changed at a prefix on the tree which invokes propagation of the changed information. In block 1102 if the change involves introduction of a new entry in the form of a leaf or if forwarding information has been lost for some topology the invoking prefix re-inherits any required forwarding information from its covering prefixes. In block 1104 the invoking prefix notifies its direct covering prefix (but not entries further upstream as this is not required for longest prefix matching). In block 1106 the invoking node further notifies downstream or covered nodes of the change.

Figure 12:
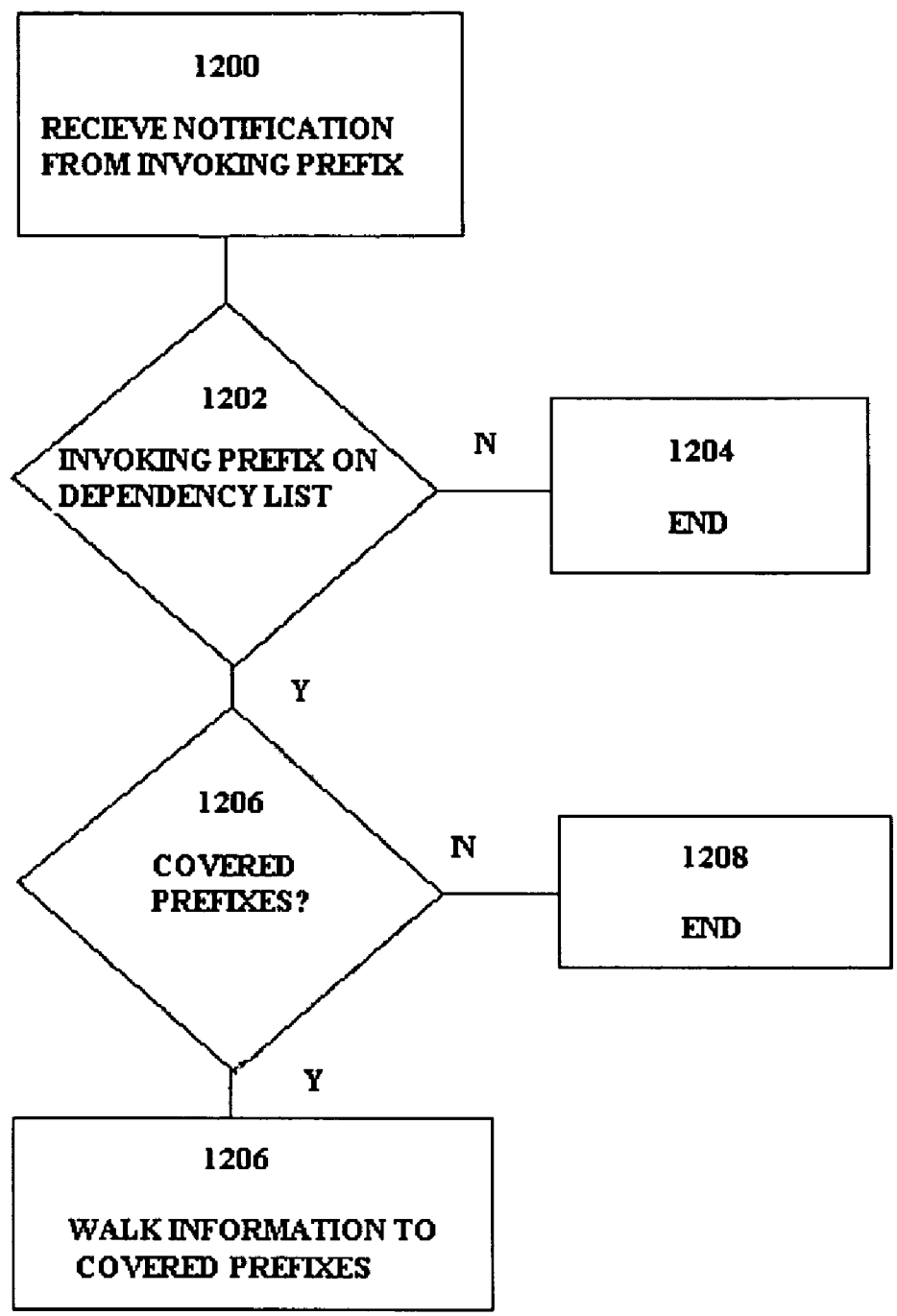
FIG. 12 is a flow diagram illustrating a method of updating downstream prefix tree entries.

A further optimization shown in FIG. 12 which is a flow diagram illustrating implementation of a dependency list at a prefix covered by the invoking prefix. In block 1200 the covered prefix receives a notification from an invoking prefix of a change to the forwarding information at the invoking prefix. In block 1202 the receiving prefix checks whether the invoking prefix is on its dependency list. As discussed above with reference to FIG. 8 each entry on the tree maintains a dependency list of all entries from which it had inherited forwarding information. As a result, if the receiving prefix does not have the invoking prefix on its dependency list then it knows that it does not have to update its forwarding information and therefore the process ends as no prefix covered by the receiving prefix will be dependent either.

Otherwise, in block 1206, the receiving prefix establishes whether it covers any prefixes. If not then at 1208 once again the process ends. If, in block 1210, there are covered prefixes then the receiving prefix forwards the notification of the change from the invoking prefix and the information is walked through all covered prefixes in that manner each repeating the same process.

As a result, when a prefix advertises a change in the adjacencies that it serves, for example, all prefixes on the tree which have inherited information from the invoking prefix will automatically update. Alternatively where a prefix joins a topology and is not present in the prefix tree than an empty record is added for it in the prefix tree and all data from its covering node is inherited together with its information for the new topology. All dependent prefixes then introduce the new topology information for the prefix. Where a prefix is removed from a topology, if the prefix is not present in any other topologies then it is simply removed from the prefix tree. Otherwise the relevant topology information for the direct covering prefix is inherited at the prefix and all of its dependencies. Where the prefix forwarding information for a given topology changes for a first FEC to a second FEC then this is merely updated in the prefix tree for the prefix and its dependencies. Because of the provision of the dependency list automatic tracking of relationships between prefixes and different topologies is achieved and it is not necessary to update the entire tree, increasing the update speed.

It will be appreciated that the various steps described above can be implemented in any appropriate manner including software, firmware, hardware or any combination, thereof and with any appropriate code changes to existing forwarding engines as will be appropriate to the skilled reader without the need for detailed description herein. For example appropriate changes can be made to the FIB/mtrie structure to allow implementation of the method including storage of multiple topology forwarding information, handling of packet classification, construction of dependency lists and propagation of changes.

As a result of the method described herein a single prefix tree provides a single lookup to perform all forwarding decisions, reducing memory requirements and providing a forwarding solution for strict and incremental modes allowing fast hardware processing requiring just one lookup and one choice step (where the choice oce is required).

4.0 Implementation Mechanisms—Hardware Overview

Figure 13:
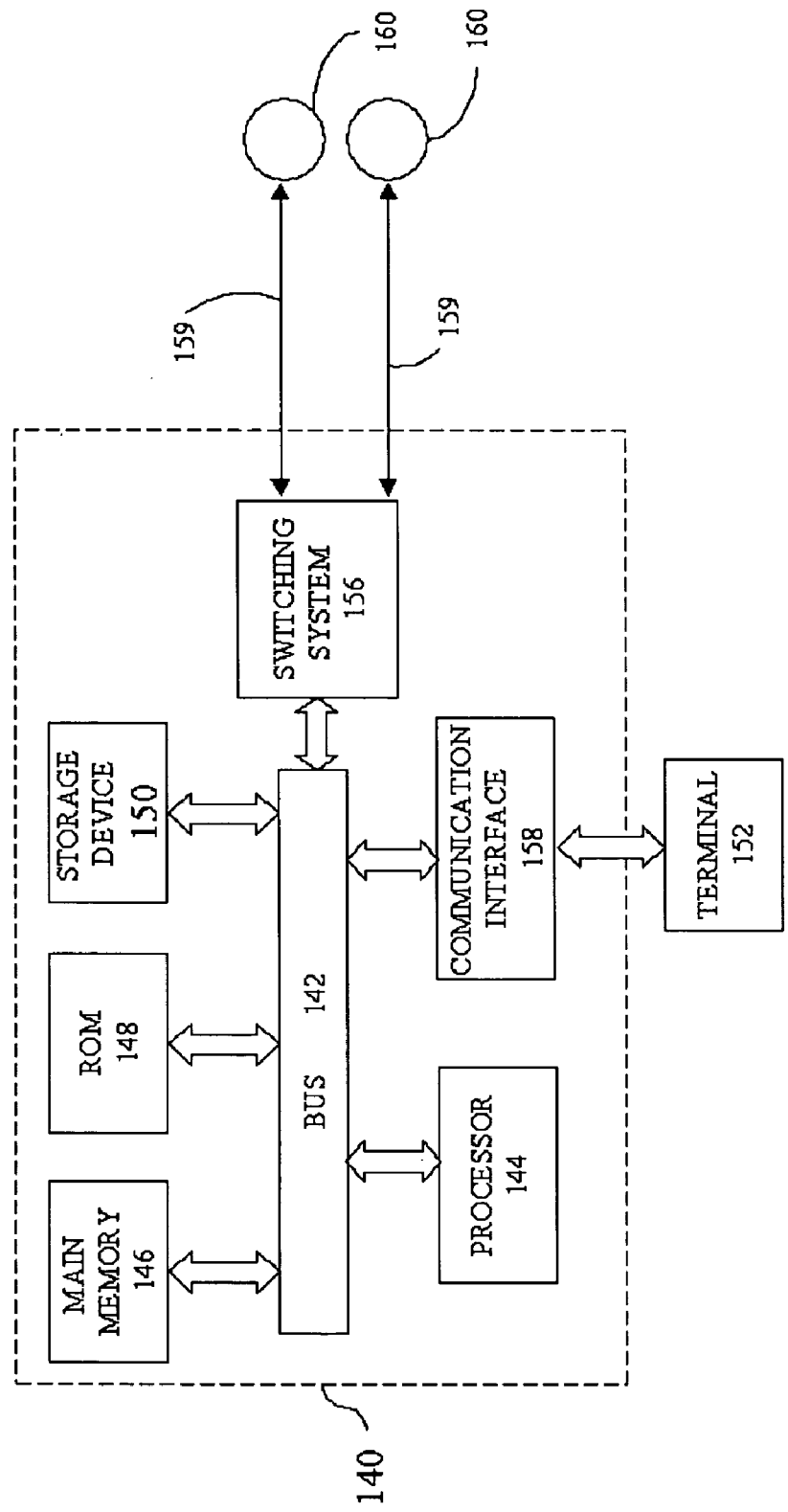
FIG. 13 is a block diagram that illustrates a computer system upon which a method for constructing a repair path may be implemented.

FIG. 13 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a constructing network component, the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. The method can be applied in any network of any topology or nature, for example a Service Provider or large enterprise network.

The prefix tree can relate to a network of any level of complexity and the approaches can be adopted at any point in the tree, and relating to a tree of any appropriate configuration rather than one necessarily dependent on the octet-structure of IP addresses. Indeed the approach can be applied in relation to any address type including IPv4 and IPv6 including a prefix/mask configuration under any type of data packet including multicast and unicast. Any protocol can be adopted and any implementing structure including mtrie and mtree and using any forwarding technology reliant on longest prefix matching, which can be extended to more or less complex address numbering structures than that described herein.

Furthermore the approach described herein can be applied to any multiple topology routing domain and any number of multiple topologies therein as appropriate.

What is claimed is:

1. A method of constructing a forwarding database for a data communications network comprising a plurality of network components and supporting at least first and second topologies having one or more common network components, wherein the forwarding database includes a plurality of entries providing forwarding information for data destined for a related network component, the method comprising the steps, performed at a constructing network component, of:

deriving topology dependent forwarding information for data destined for a network component; and including the topology dependent forwarding information at a related forwarding database entry;

wherein the topology dependent forwarding information is associated with both forwarding instructions for the first topology and forwarding instructions for the second topology;

wherein the forwarding database comprises a single prefix tree and the forwarding database entry comprises a prefix entry;

in which the topology dependent forwarding information is derived by inheriting the forwarding information from a covering entry in further comprising the step of identifying a forwarding database entry for the related network component for which data is destined, classifying the data to identify its topology, and selecting the topology dependent forwarding information accordingly.

2. The method as claimed in claim 1 in which, where one of the first and second topologies is a base topologies and the other of the first and second topologies is an additional topology, additional topology forwarding information is derived by copying base topology information at a forwarding database entry in an incremental mode.

3. The method as claimed in claim 1 further comprising maintaining a dependency list at the prefix entry of all entries from which the forwarding information has been inherited.

4. The method as claimed in claim 3 comprising constructing an updated forwarding database including the step, performed in relation to an invoking entry, of updating forwarding information at the invoking entry.

5. The method as claimed in claim 4 in which the invoking entry notifies its direct covering entry of its updated forwarding information.

6. The method as claimed in claim 4 in which the invoking entry notifies all covered entries as receiving entries of its updated forwarding information.

7. The method as claimed in claim 6 further comprising the step, performed in relation to a receiving entry, of updating its forwarding information if the invoking entry is on its dependency list.

8. The method as claimed in claim 1 in which, if the data is forwarded in strict mode in a topology and there is no forwarding information for that topology at the related entry for the related network component for which data is destined, then the data is not forwarded.

9. The method as claimed in claim 1 in which the forwarding database entry is identified by a longest-prefix match.

10. The method as claimed in claim 1 in which one of the first and second topologies is a base topology.

11. The method as claimed in claim 1 further comprising at least one further topology having one or more common network components with the base topology and in which the forwarding database entry includes all available topology dependent forwarding information.

12. A method of constructing a forwarding database for a data communications network comprising a plurality of network components and supporting at least first and second topologies having one or more common network components, wherein the forwarding database includes a plurality of entries providing forwarding information for data destined for a related network component, the method comprising the steps, performed at a constructing network component, of:

deriving topology dependent forwarding information for data destined for a network component; and including the topology dependent forwarding information at a related forwarding database entry;

wherein the topology dependent forwarding information is associated with both forwarding instructions for the first topology and forwarding instructions for the second topology;

wherein the forwarding database comprises a single prefix tree and the forwarding database entry comprises a prefix entry;

in which the topology dependent forwarding information includes a topology selection element;

further comprising the step of identifying a forwarding database entry for the related network component for which data is destined, classifying the data to identify its topology, and selecting the topology dependent forwarding information accordingly.

13. The method as claimed in claim 12 in which the topology selection element comprises a choice output chain element.

14. The method as claimed in claim 12 in which, if the forwarding information is common irrespective of selected topology, the topology selection element is removed.

15. A computer readable volatile or non-volatile medium storing one or more sequences of instructions which, when executed by one or more processors, cause the one or more processors to perform:
  constructing a forwarding database for a data communications network comprising a plurality of network components and supporting at least first and second topologies having one or more common network components, wherein the forwarding database includes a plurality of entries providing forwarding information for data destined for a related network component by:
    deriving topology dependent forwarding information for data destined for a network component; and
    including the topology dependent forwarding information at a related forwarding database entry;
  wherein the topology dependent forwarding information is associated with both forwarding instructions for the first topology and forwarding instructions for the second topology;
  wherein the forwarding database comprises a single prefix tree and the forwarding database entry comprises a prefix entry;
  in which the topology dependent forwarding information is derived by inheriting the forwarding information from a covering entry in the prefix tree;
  further storing instructions for identifying a forwarding database entry for a related network component for which data is destined, classifying the data to identify its topology, and selecting topology dependent forwarding information accordingly.

16. The computer readable volatile or non-volatile medium of claim 15 in which the topology dependent forwarding information includes a topology selection element.

17. The computer readable volatile or non-volatile medium of claim 16 in which, if the forwarding information is common irrespective of selected topology, the topology selection element is removed.

18. An apparatus comprising one or more processors; and a network interface communicatively coupled to the one or more processors and configured to communicate one or more packet flows among the one or more processors in a network and a computer readable volatile or non-volatile medium storing one or more sequences of instructions which, when executed the by one or more processors, cause the one or more processors to perform:
  constructing a forwarding database for a data communications network comprising a plurality of network components and supporting at least first and second topologies having one or more common network components, wherein the forwarding database includes a plurality of entries providing forwarding information for data destined for a related network component by:
    deriving topology dependent forwarding information for data destined for a network component; and
    including the topology dependent forwarding information at a related forwarding database entry;
  wherein the topology dependent forwarding information is associated with both forwarding instructions for the first topology and forwarding instructions for the second topology;
  wherein the forwarding database comprises a single prefix tree and the forwarding database entry comprises a prefix entry;
  in which the topology dependent forwarding information is derived by inheriting the forwarding information from a covering entry in the prefix tree;
  further comprising the step of identifying a forwarding database entry for the related network component for which data is destined, classifying the data to identify its topology, and selecting the topology dependent forwarding information accordingly.

19. The apparatus of claim 18 in which the topology dependent forwarding information includes a topology selection element.

20. The apparatus of claim 19 in which, if the forwarding information is common irrespective of selected topology, the topology selection element is removed.

21. An apparatus for constructing a forwarding database for a data communications network comprising a plurality of network components and supporting at least first and second topologies having one or more common network components, wherein the forwarding database includes a plurality of entries providing forwarding information for data destined for a related network component, the apparatus comprising:
  means for deriving topology dependent forwarding information for data destined for a network component; and
  means for including the topology dependent forwarding information at a related forwarding database entry;
  wherein the topology dependent forwarding information is associated with both forwarding instructions for the first topology and forwarding instructions for the second topology;
  wherein the forwarding database comprises a single prefix tree and the forwarding database entry comprises a prefix entry;
  in which the topology dependent forwarding information is derived by inheriting the forwarding information from a covering entry in the prefix tree;
  further comprising the step of identifying a forwarding database entry for the related network component for which data is destined, classifying the data to identify its topology, and selecting the topology dependent forwarding information accordingly.

* * * * *